(12) United States Patent
Seng

(10) Patent No.: US 11,488,757 B2
(45) Date of Patent: Nov. 1, 2022

(54) LEVITATION AND PROPULSION UNIT TWO (LPU-2)

(71) Applicant: Sin Soon Seng, Singapore (SG)

(72) Inventor: Sin Soon Seng, Singapore (SG)

( * ) Notice: Subject to any disclaimer, the term of this patent is extended or adjusted under 35 U.S.C. 154(b) by 0 days.

(21) Appl. No.: 15/929,564

(22) Filed: May 11, 2020

(65) Prior Publication Data

US 2021/0347503 A1 Nov. 11, 2021

(51) Int. Cl.
*H01F 7/16* (2006.01)
*B64G 1/40* (2006.01)
*F03H 99/00* (2009.01)

(52) U.S. Cl.
CPC ........... *H01F 7/1623* (2013.01); *B64G 1/409* (2013.01); *F03H 99/00* (2013.01)

(58) Field of Classification Search
CPC ........ B64G 1/409; H01F 7/1623; F03H 99/00
See application file for complete search history.

(56) References Cited

U.S. PATENT DOCUMENTS

| | | | | |
|---|---|---|---|---|
| 3,639,871 A | * | 2/1972 | Trbovich | H02K 33/18 335/274 |
| 4,144,514 A | * | 3/1979 | Rinde | H01F 7/13 137/551 |
| 4,928,028 A | * | 5/1990 | Leibovich | H01F 7/1646 310/23 |
| 6,239,517 B1 | * | 5/2001 | Nakamura | B41J 25/006 101/93.04 |
| 6,422,533 B1 | * | 7/2002 | Harms | F16K 31/0613 251/129.1 |
| 2004/0216498 A1 | * | 11/2004 | Johansson | D03D 47/363 66/163 |
| 2006/0226713 A1 | * | 10/2006 | Lehr | H02K 41/031 310/12.04 |
| 2008/0136282 A1 | * | 6/2008 | Okazaki | H02K 55/04 310/156.36 |
| 2011/0001591 A1 | * | 1/2011 | Puth | H01F 7/1615 335/229 |
| 2011/0020156 A1 | * | 1/2011 | Van Brunt | F04B 17/04 417/416 |

* cited by examiner

*Primary Examiner* — Mohamad A Musleh

(57) ABSTRACT

Levitation and Propulsion Unit-2 (LPU-2) is a thrust generating device able to generate resultant force to create motion without mass flow and/or momentum exchange. The technology primarily uses electromagnetic energy, permanent magnetic repulsive energy and kinetic energy, to generate internal resultant thrust or motion. This thrust generating device comprises of one or two rapid action enable and high driving force electromagnet moving magnet linear actuators with minimum moving parts. The technology mainly leverages on compression and expansion of compressed repulsive magnetic flux. Through regulation and systematic control of current to each electromagnet, the device is able to generate resultant force or motion without external interaction.

8 Claims, 5 Drawing Sheets

LEVITATION AND PROPULSION UNIT TWO (LPU-2)

RELATED APPLICATIONS

This patent application is mainly related to earlier patent granted invention title: Levitation and Propulsion Unit (LPU), filed under PCT application PCT/SG2006/000055, filing dated 14 Mar. 2006, and its related countries applications. And, Singapore first filed patent pending title: Rapid Action Enabled and High Driving Force Electromagnet Moving Magnet Linear Actuator.

The patent granted invention title: Levitation and Propulsion Unit (LPU) is a thrust generating device as claimed to generate resultant force to create motion from centrifugal force and magnetic flux expansion without mass ejection and/or momentum exchange, unlike current propulsion technologies as in automobile, drone, airplane, helicopter, rocketry, train, boat, bicycle, scooter, wheelchair, or even walking.

The patent pending application title: Rapid Action Enabled and High Driving Force Electromagnet Moving Magnet Linear Actuator is an electromagnet actuator device as claimed to enable rapid action and high driving force of actuator plunger to mainly meet invention, Levitation and Propulsion Unit (LPU) application requirements and other similar field device application requirements, or in electromagnet actuator application with similar requirements.

FIELD OF THE INVENTION

This Levitation and Propulsion Unit-2 (LPU-2) is a thrust generating device in the field of inertia propulsion. Inertia propulsion is propulsion without mass ejection and/or momentum exchange, unlike all current propulsion technologies. This classification of propulsion is generally deemed not workable or not feasible. Thus, less explored, and at its infancy. Inertia propulsion technology does not need traction, aerodynamics or expulsion of mass, to create resultant motion. This LPU propulsion technology generates internal thrust to create resultant motion by impulse drive with no external moving parts or mass ejection. The non-dependent of external environment to create resultant motion makes inertia propulsion technology's operational efficiency very high, and able to offer wider operational capabilities which current propulsion technologies unable.

BACKGROUND OF INVENTION

Past and current attempts in inertia technology uses orbital in an eccentric ellipse approach, or quick shifting of CG, to create external motion in horizontal plane, with only subtle effect. Earlier invention and patent granted, LPU's technology uses totally different and novel approach in inertia propulsion with pronounce effect. The LPU's technology is able to demonstrate resultant force generation in vertical, horizontal planes, and in pendulum set-up—checkout YouTube's search under: samss3, for technology disclosure video clips under Sam Sin.

This thrust generating invention, Levitation and Propulsion Unit-2 (LPU-2), is another version of patent granted earlier invention, Levitation and Propulsion Unit (LPU). This new version, LPU-2, the objective to minimize moving parts, to reduce wear and tear associated with moving parts, and still able to generate resultant force without mass ejection and/or momentum exchange.

BRIEF SUMMARY OF THE INVENTION

This thrust generating device, LPU-2, mainly generate internal impact impulse to create a resultant force without external interaction, unlike current propulsion technologies whereby it involved mass ejection and/or momentum exchange. This thrust generating technology primarily uses electromagnetic energy, permanent magnetic repulsive energy and kinetic energy, to generate internal resultant thrust. The technology leverages on compressed magnetic repulsive flux to convert an induced force into conserved energy and back to driving action force, to accelerate a mass to generate impact force, to create a resultant force without external interaction. To create continuous motion, it is similar to multi-stage rocket, i.e. previous impact momentum supports the next stage generation of impact momentum. The process of resultant force generation of this Levitation and Propulsion Unit-2 (LPU-2), FIG. 1 & FIG. 4, is similar to patent granted Levitation and Propulsion Unit (LPU). The process still involves downward and upward phases of a cycle. But, the design of LPU-2 is different. The basic operating system incorporates any two electromagnet devices able to create rapid action and/or high driving force plunger action to meet application, in particular, the electromagnet moving magnet linear actuators. The LPU-2 design minimizes moving parts to reduce wear and tear. Compare to earlier invention Levitation and Propulsion Unit (LPU) which also leverage on centrifugal force where more moving parts are involved. This LPU-2, the moving parts are mainly on the two plunger assemblies, see FIG. 1 and plunger assembly at FIG. 2. Now, resultant force generation is mainly through regulation and systematic control of current to each coil of electromagnet to move each plunger assembly to enable compression and then expansion of compressed magnetic repulsive flux to accelerate transfer panel 06, to create each impact momentum.

This invention preferred embodiment-1 at FIG. 1 and other 15 others embodiments until embodiment-16 mainly refer to electromagnet moving magnet linear actuator. This invention can similarly function with other type of electromagnet devices that able to create rapid action and/or high driving force action to create impact to generate resultant force to meet application. The LPU-2 applications mainly in transport mobility on Earth and in Space.

BRIEF DESCRIPTION OF THE VIEWS OF THE DRAWING

The following drawings are for illustration only. Each drawing mainly to show the main components layout to each other to support related description. Component size, configuration including magnet polarity and composition can differ in product to meet component constrains, application constrains, and/or further outlines described in various embodiments.

FIG. 1 illustrate top mounting to application using mounting components 01 & 01A. This FIG. 1 view illustrates a typical layout of main components of this Levitation and Propulsion Unit-2 (LPU-2) invention under preferred embodiment-1.

DETAILED DESCRIPTION OF THE INVENTION

Figure 1:
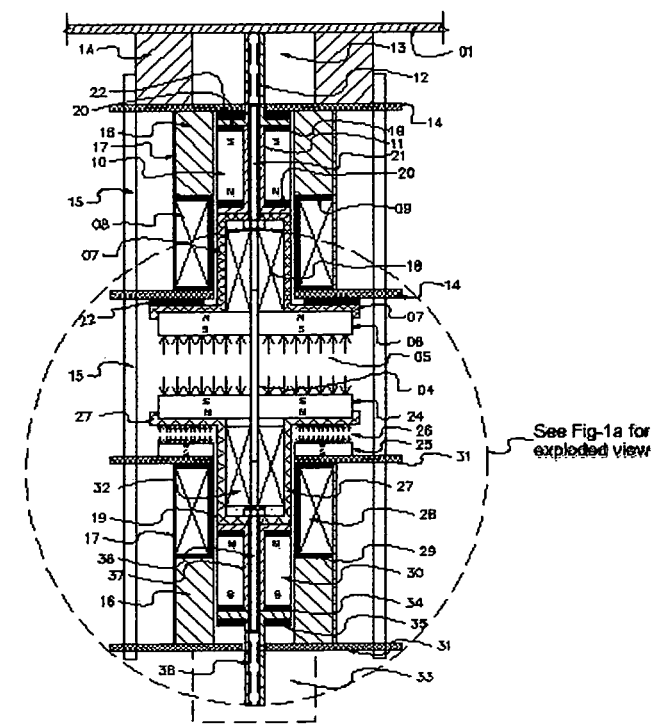
FIG. 1: Sectional view illustration only of a typical Levitation and Propulsion Unit-2 (LPU-2) under preferred embodiment-1 which the assembly comprises of two electromagnet moving magnet linear actuator assemblies and a central spline or shaft 04, wherein the lower actuator include magnet 25 located between transfer panel magnet 24 and casement member 31. Each electromagnet moving magnet linear actuator comprises mainly of two main components, i.e. plunger assembly FIG. 2 arranged in stator coil assembly FIG. 3 with an air gap 19. Optical/laser sensors at location 13 & 33 to sense each respective plunger assembly FIG. 2 position and motion. Mounting of LPU-2 can be side, bottom or top mount of LPU-2 to application, or incorporated into application.

LPU-2 is a thrust generating device which the technology primarily uses electromagnetic energy, permanent magnetic repulsive energy and kinetic energy, to generate internal resultant thrust. The technology leverages on compressed magnetic repulsive flux to convert an induced force into conserved energy and back to driving force, to accelerate a mass to generate impact force, to create a resultant force without external interaction. This Levitation and Propulsion Unit-2 (LPU-2), see FIG. 1, of cylindrical profile configuration is the preferred embodiment-1. It mainly comprises of two units of electromagnet moving magnet linear actuators to generate resultant force with minimum moving parts. It can similarly operate in one unit of electromagnet moving magnet linear actuator. The electromagnet moving magnet linear actuator in preferred embodiment-1 is of similar design to patent pending title: Rapid Action Enabled and High Driving Force Electromagnet Moving Magnet Linear Actuator.

The functions of first electromagnet actuator are similar to the electromagnet in strike panel described in specification of earlier invention, Levitation and Propulsion Unit (LPU). At downward phase, the first actuator energized to move transfer panel magnet 06 to further compress magnetic repulsive flux 05. And at upward phase, the transfer panel magnet 06 accelerated to create impact. The second electromagnet actuator of configuration similar to an inverted form of first electromagnet actuator. It takes the functional roles of all following main components of earlier invention LPU, i.e. spinning flywheel, sliding angular couplings, spinning wheel and motor. The functions of second electromagnet actuator mainly to facilitate transformation of induced force to conserve energy and back into action force. This LPU-2 design minimizes moving parts to reduce wear and tear, simplify control—less parts, and still able to generate resultant force without external interaction.

The material of components mainly of non-ferrous material like aluminum, titanium, stainless steel, brass, polymer, alloy, plastic, carbon fiber, ceramic; or ferrous materials, ferromagnetic; or composite of materials or other equivalent materials, to meet each component functional and structural requirement to meet application and device requirements.

Figure 1A:
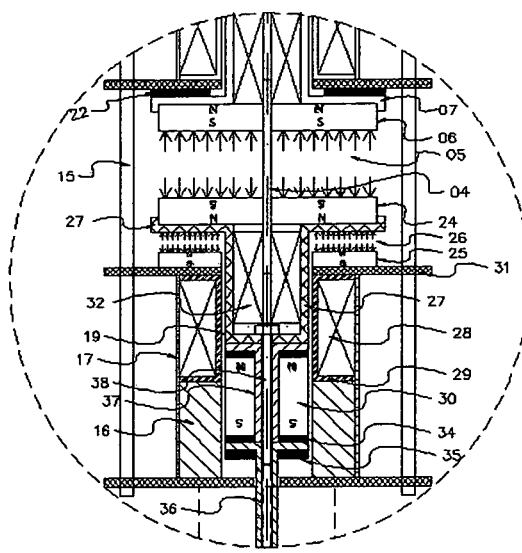
FIG. 1a: An exploded sectional view illustration only of a typical LPU-2 middle section under preferred embodiment-1, to mainly highlight present of magnet 25 and magnet repulsive flux zone 26.

The LPU technology leverages on compression and expansion of compressed repulsive magnetic flux. The magnetic repulsive flux function as the medium in potential energy source and conservation of energy, to accelerate transfer panel (mass) in generation of resultant force. In this preferred embodiment-1, FIG. 1, compressed magnetic repulsive flux zone 05 and zone 26 function as potential energy sources and conservation of energy. First magnetic repulsive flux zone 05, between transfer panel 06 and transfer panel magnet 24. Second magnetic repulsive flux zone 26, between magnet 25 and transfer panel magnet 24. Magnet 25 is secured to casement member 31—see FIG. 1a. The facing side of both magnet 24 and magnet 25 of same polarity to create the second magnetic repulsive flux zone 26. This compressed repulsive flux zone 26 enable additional flux compression at downward phase and enable more expansion forces at upward phase. This repulsive flux zone 26 enable lesser current to stator coil 28 during cycle operation. The level of compressed repulsive flux density at these two zones at default stage depend on the amount and frequency of resultant force generation to meet application, in addition to other parameters, i.e. transfer panel mass and width, current, coil, magnets, device space, etc.

Figure 5:
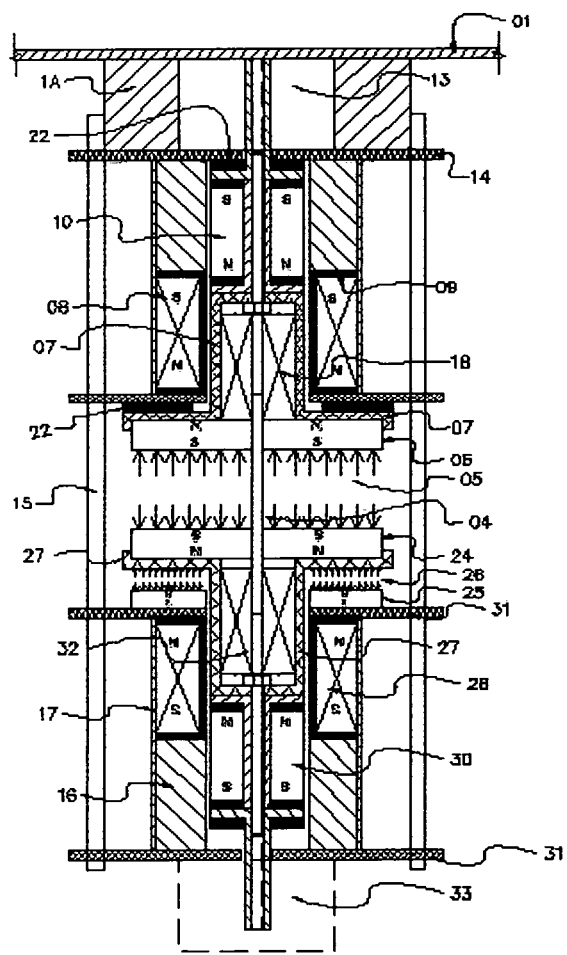
FIG. 5: Sectional view illustration only of a typical Levitation and Propulsion Unit-2 (LPU-2) under preferred embodiment-1 which features the status of both stator coils at start of downward phase of a cycle and similarly the status of magnetic repulsive flux zone 05 and 26.
Figure 5A:
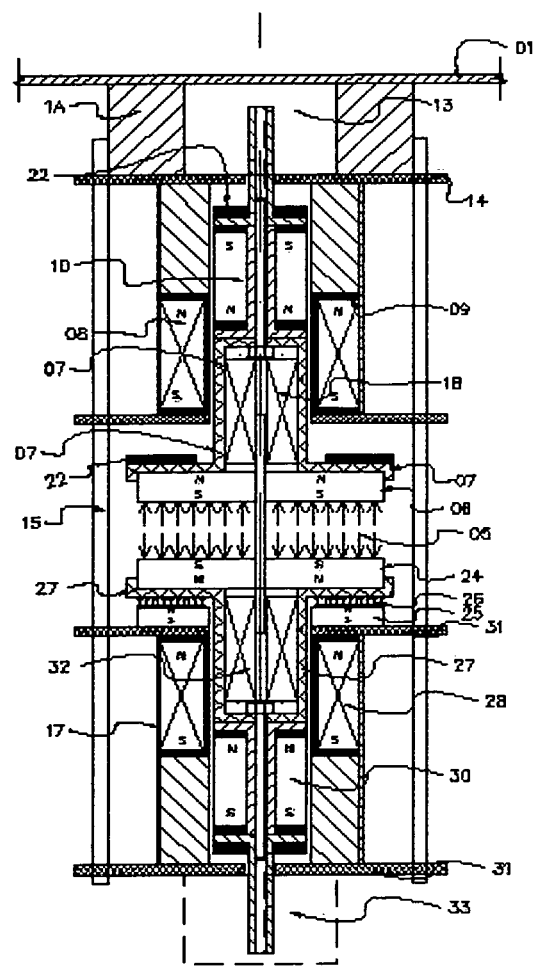
FIG. 5A: Sectional view illustration only of a typical Levitation and Propulsion Unit-2 (LPU-2) under preferred embodiment-1 which features the status of both stator coils at start of upward phase of cycle and similarly the status of magnetic repulsive flux zone 05 and 26.

Device basic operation cycle, see FIG. 5 & FIG. 5A, which illustrate each main component status at each phase of a cycle. The basic operation cycle comprises of downward and upward phases of a cycle. Each cycle starts with downward phase which energizes stator coil 08 to create coil polarities wherein coil 08 "north" is nearest to transfer panel magnet 06 and coil "south" is nearest to magnet 10, as reflected at FIG. 5. This coil 08 status creates repulsion force between coil 08 and transfer panel magnet 06, and attraction force between coil 08 and magnet 10 to pull magnet 10 into stator 09 which together create the driving force to move the plunger assembly with transfer panel magnet 06 downward to further compress magnetic repulsive flux zone 05—see FIG. 5a. At the same time, repulsive flux zone 26 is also further compressed due this coil 08 induced driving force. At upward phase, the current polarities to coil 08 that induced the driving force is reversed momentarily wherein now coil 08 "north" is nearest to magnet 10 and coil "south" is nearest to transfer panel 06, see FIG. 5a. This coil 08 status creates attractive force between coil 08 and transfer 06, and repulsive force between coil 08 and magnet 10 which together momentarily create a pull-up force momentarily on the plunger assembly FIG. 2 with transfer panel magnet 06 upward to mainly overcome its inertia. And thereafter, current to coil 08 switch off. In condition where there is sufficient strong potential energy at compressed magnetic flux zone 05 and/or 26 at end of downward phase, relative to the thrust and frequency to generate, inertia of plunger assembly with transfer panel magnet 06 to overcome and other parameters to assess, no momentarily reversal of current needed. Then, current to coil 08 is switch-off once downward phase stop. The highly compressed magnetic flux at zone 05 and 26 immediately expand, due to no driving force or low pressure. The flux expansion force accelerates the transfer panel magnet 06 and connected plunger assembly FIG. 2 upward to impact casement member 14 to create the resultant force. At the same time, at start of upward phase, the coil 28 can momentarily energized to create an induced pulse force to push transfer panel magnet 24 and plunger assembly FIG. 2 upward. This, to mainly drive magnetic flux expansion upward at zones 05, and also enable upward release of flux compression pressure at zone 26. This to reduce the flux zone 05 expansion to act downward on transfer panel magnet 24 and on nearest casement member 31 which can create drag against the intended direction via impact momentum.

Alternatively, the system can create resultant motion via flux expansion from the compressed flux expansion at zone 05 and/or 26 if coil 28 not energized after end of downward phase of a cycle. The flux expansion instantly acts on the transfer panel 24 and nearest casement member 31 once the downward phase stops. The flux expansion pushes the whole device in opposite direction to the direction create by impact force. At the same time the flux expansion also acts on the transfer panel 06 to push it to impact casement member 14. The opposite direction motion created by flux expansion stop once transfer panel magnet 06 impact on the casement member 14. This opposite direction resultant motion is by flux expansion. This opposite resultant motion does not carried momentum unlike the motion by impact force from transfer panel magnet 06 created by momentarily energized coil 28 which push transfer panel magnet 24 to direct the flux expansion upward. The resultant motion via flux expansion is in step motion per cycle, i.e. step by step, no continuous motion or momentum like via impact force. The one electromagnet thrust generating device mainly functions in this manner.

Figure 2:
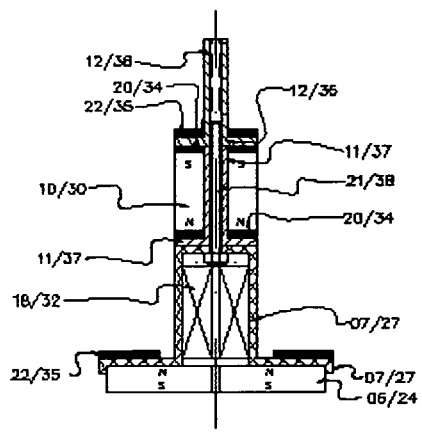
FIG. 2: Sectional view illustration only of a typical cylindrical profile plunger assembly which refer to both electromagnet actuators wherein each mainly comprises of magnet 10 or 30 at one end of plunger shaft 07 or 27 and magnet 06 or 24 at the other end which formed the transfer panel, impact element 22 or 35, optional add-mass material 18 or 32, clamp shaft 11 or 37 & 12 or 36, clamp lock bolt 21 or 38 and packing element 20 or 34.
Figure 3:
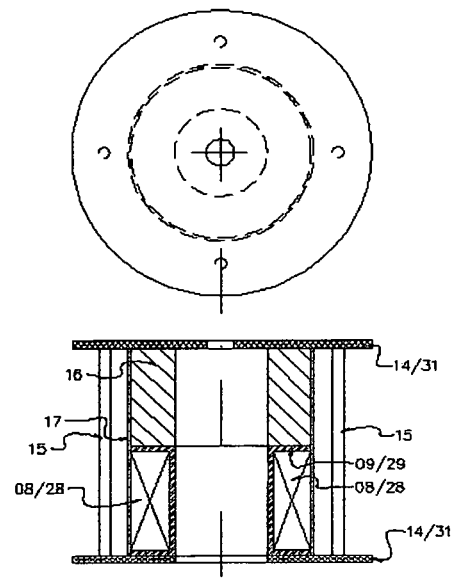
FIG. 3: Sectional view illustration only of a typical cylindrical profile of stator assembly and its plan view, which refer to in both electromagnet actuators wherein each mainly comprises of stator coil 08 or 28, stator 09 or 29, spacer member 16, casement members 17 & 14 or 31 and bracing rods 15.

The amount of induced driving force on the plunger assembly FIG. 2 mainly depends on the magnetic flux density and flux spread of magnet 10 and magnet 06, in relation to coil 08 layout, its energized electromagnetic flux density and spread. Similar consideration on a magnet 30 and magnet 24 to coil 28. At device design stage, amongst other parameters, need to determine the maximum amount able to drive transfer panel magnet 06 and 24 to further compress the already compressed magnetic flux zones 05 and 26, to optimally conserve the energy in the form of compressed magnetic flux at both zones. And, at upward phase, able to create the needed energy at flux expansion to accelerate transfer panel magnet 06 and plunger assembly FIG. 2 to generate the resultant impact force.

At downward phase, as the energized coil 08 induced a driving force to move the plunger assembly FIG. 2 downward, there is an equal opposite force acting on the coil 08 to move upward or opposite direction, i.e. Newton $3^{rd}$ law: action=reaction. The coil 08 is connected to the device casement and application, therefore, the reacting force move the whole device and its application upward or opposite direction to the transfer panel magnet 06 and plunger assembly FIG. 2 motion. In gravity environment, if the induced force is sufficient, the reacting force creates a momentarily lift or motion, and it stop once the induced force stop, and gravity pull it back down at nominal rate 9.84 m/sec square. In gravity environment, the amount of lift or opposite motion to transfer panel magnet 06 motion depends on the mass of the device and its application. If the reacting force is not sufficient to create motion, the reacting force which also acts along the force path and area around coil 08 connection can flex or deform the material—dependent on elasticity of the material and/or structure. Therefore, the device structural adequacy and suitable electromagnet actuator device are needed to meet functional requirement to meet application requirement. In zero gravity environment, the reacting force can move the device and application in opposite direction to the transfer panel magnet 06 and plunger assembly FIG. 2 motion, and the motion stop once the transfer panel magnet 06 motion stop.

To create continuous motion, it is similar to multi-stage rocket, i.e. previous impact momentum supports the next stage generation of impact momentum. In gravity environment, if the frequency of an impact resultant force is faster the gravitation acceleration, the lift or motion created by reacting force at downward phase of a cycle can continue with the impact momentum at upward phase of the cycle. Therefore, in gravity environment, to create airborne propulsion and levitation functions, cycle frequency higher than gravitation acceleration and sufficient resultant force generation in a cycle to meet application requirement are essential. In zero gravity environment, cycle frequency and resultant force sufficiency may not be essential to create motion, continuous motion and etc.

This Levitation and Propulsion Unit-2 (LPU-2), resultant force generation is mainly through regulation and systematic control of current to each coil of electromagnet to move each plunger assembly FIG. 2 to create the desire resultant motion and motion direction.

This Levitation and Propulsion Unit-2 (LPU-2) applications mainly in transport mobility on Earth and in Space. It can complement or supplant current propulsion technologies. The layout of main components is scalable to meet application requirement. And, the design of this LPU-2 is scalable and/or apply in combination of more than one unit to meet application requirement.

As described at para [0025] to [0030], the LPU technology basically leverages on compression and expansion of compressed magnetic repulsive flux to accelerate a mass to create impact to generate a resultant force motion. Alternatively, as described at para [0029], the technology can also create resultant motion in opposite direction to impact resultant motion direction by leverage the expansion of compressed magnetic flux only without energize coil 28 at end of downward phase of a cycle. Therefore, the control of compressed magnetic repulsive flux expansion determines the direction of resultant force motion. There are many embodiments able to create this outcome, like earlier patent granted invention: Levitation and Propulsion Unit (LPU) which also leverages on centrifugal force in the resultant force generation. There are also various devices to create the exertive force to further compress the compressed magnetic repulsive flux to create the potential energy for flux expansion. The suitability of such devices depends the function and its response time to meet application requirements, e.g. to defy gravity, response time need to be faster than gravitation acceleration.

Figure 4:
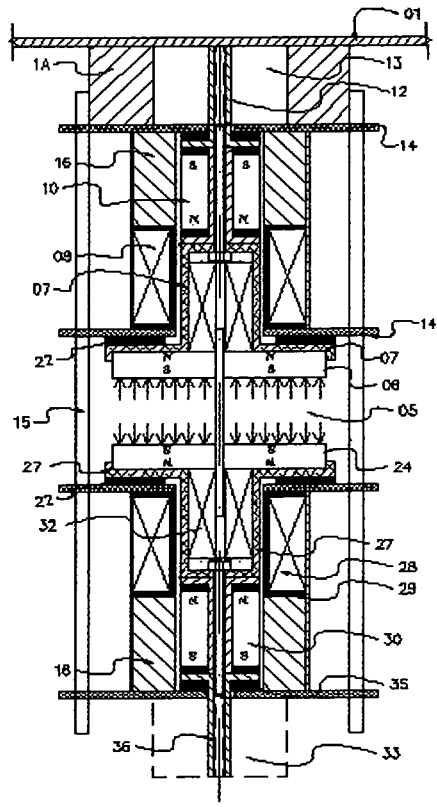
FIG. 4: Sectional view illustration only of a typical Levitation and Propulsion Unit-2 (LPU-2) under embodiment-2 which the assembly comprises of two electromagnet moving magnet linear actuator assemblies wherein there is no magnet 25.

Other embodiments of this Levitation and Propulsion Unit-2 (LPU-2) invention design: Embodiment-2, FIG. 4, same as Embodiment-1 as in FIG. 1 but there is no magnet 25, thus no repulsive zone 26. This design enables switching of electromagnet actuator to start the downward phase, to enable change of impact resultant force direction via system control.

Figure 7:
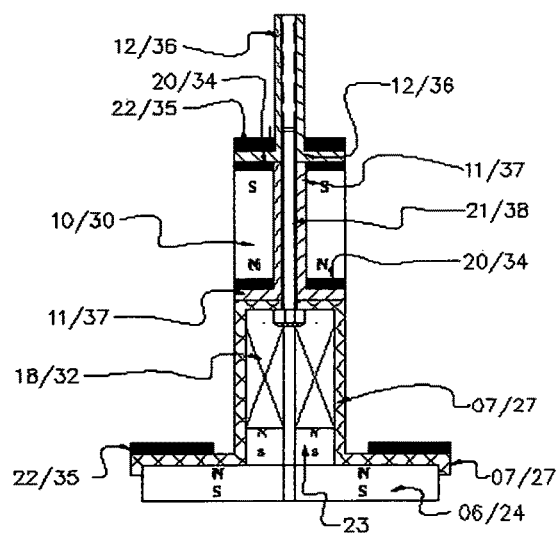
FIG. 7: Sectional view illustration only of a typical cylindrical profile plunger assembly, as in FIG. 2, with additional magnet 23 in plunger shaft after transfer panel magnet 06 and/or 24.

Embodiment-3: include preferred Embodiment-1 and/or Embodiment-2, wherein the electromagnet/s comprise of additional magnet/s at position 18 and/or 32 in plunger shaft length—see FIG. 7, or additional magnet/s secure on plunger shaft profile length, to enable further increase plunger thrust force to further compress magnetic flux zone 05 to create higher potential energy at downward phase of a cycle. And, at upward phase of a cycle, enable higher energy release from expansion of compressed magnetic flux 05 to further accelerate the transfer panel to create higher impact force to create higher resultant motion of application.

Embodiment-4: include preferred Embodiment-1, Embodiment-2 and/or Embodiment-3, wherein the electromagnet/s magnet 10 and/or 30 include or replace with other material to add mass to plunger assembly to increase driving mass to increase impact force.

Embodiment-5: include Embodiment-3, wherein the electromagnet there is no magnet 10 and/or 30.

Embodiment-6: include preferred Embodiment-1, Embodiment-2, Embodiment-3, Embodiment-4 and/or Embodiment-5, wherein the electromagnet/s comprises of more than one individual control coil on stator to enable control of plunger travel via systematic energizing of each coil or all coils.

Embodiment-7: include preferred Embodiment-1, Embodiment-2, and/or Embodiment-6, wherein the electromagnet's include magnet's at stator to increase respond time and control of plunger assembly.

Figure 6:
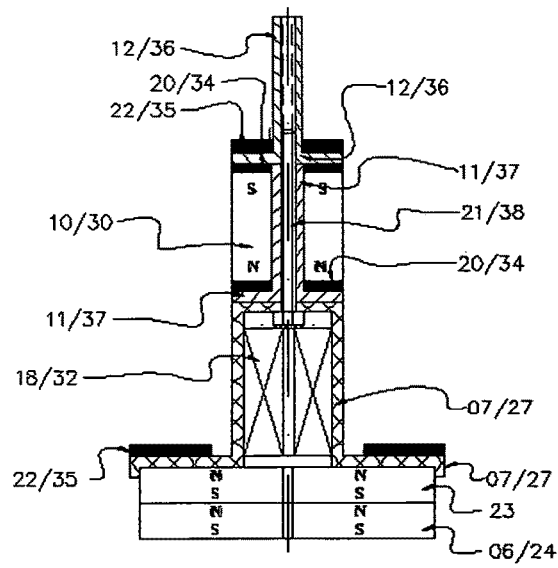
FIG. 6: Sectional view illustration only of a typical cylindrical profile plunger assembly, as in FIG. 2, with additional magnet 23 after transfer panel magnet 06 and/or 24.

Embodiment-8: include preferred Embodiment-1, Embodiment-2 and/or above Embodiments, wherein the electromagnet's plunger assembly includes permanent magnet 23—see FIG. 6 & FIG. 7.

Figure 10:
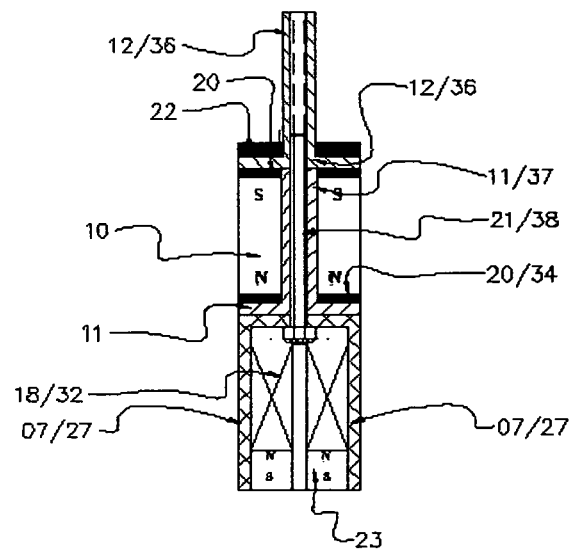
FIG. 10: Sectional view illustration only of a typical cylindrical profile plunger assembly, as in FIG. 2, with additional magnet 23 in plunger shaft but without shaft flange.
Figure 11:
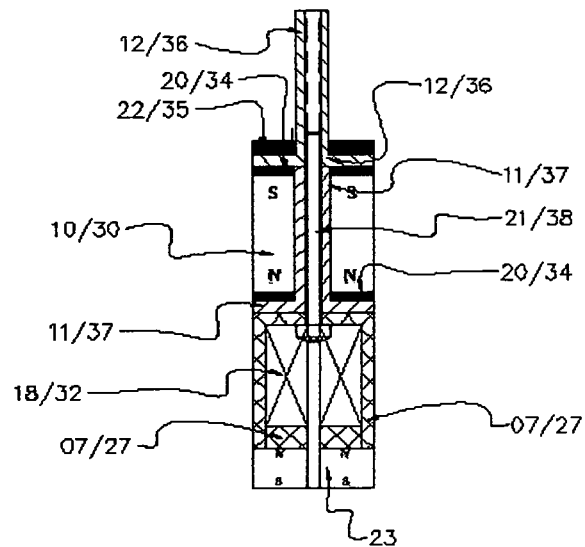
FIG. 11: Sectional view illustration only of a typical cylindrical profile plunger assembly, as in FIG. 2, with additional magnet 23 outside plunger shaft and without shaft flange.

Embodiment-9: include Embodiment-1, Embodiment-2, and/or above Embodiments, wherein the electromagnet's plunger assembly exclude the flange at plunger shaft—see FIG. 10 & FIG. 11, or with a flange without edge thickening.

This plunger configuration facilitates attachment of other transfer panel magnet 06 and/or 24 profile to meet application requirements.

Figure 8:
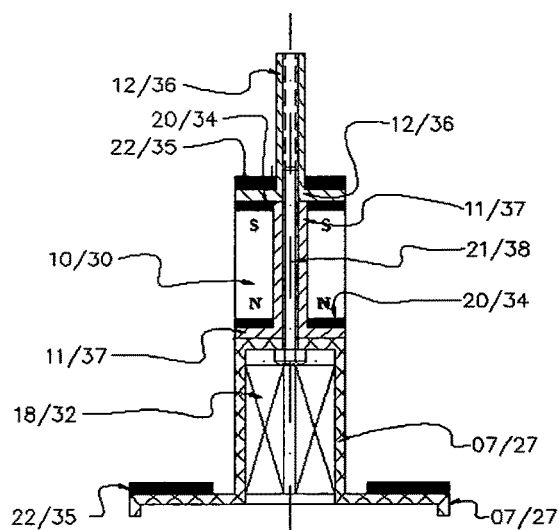
FIG. 8: Sectional view illustration only of a typical cylindrical profile plunger assembly, as in FIG. 2, without transfer panel magnet 06 and/or 24.
Figure 9:
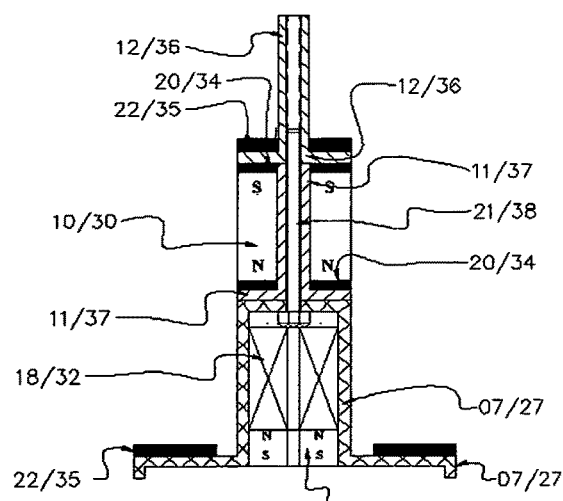
FIG. 9: Sectional view illustration only of a typical cylindrical profile plunger assembly, as in FIG. 2, with additional magnet 23 in plunger shaft but without transfer panel magnet 06 and/or 24.

Embodiment-10: include Embodiment-1, Embodiment-2, and/or to Embodiment-8, wherein the electromagnet's plunger assembly exclude transfer panel magnet 06 and/or 24, —see FIG. 8, but can include a separate permanent magnet 23 —see FIG. 9. This plunger configuration facilitates attachment of similar or other transfer panel profile, magnet's and/or materials which can comprises of ring magnet, other profile permanent magnet, electromagnet or composite of magnets and other material, to meet application, or to meet other similar field device application requirement, or other electromagnet actuator of similar requirements.

Embodiment-11: include Embodiment-1, Embodiment-2, and/or above Embodiments, wherein the electromagnet's the magnet profile, stator and/or plunger assembly not of cylindrical profile. The profile to meet best performance of components and/or constraint of application requirements.

Embodiment-12: include Embodiment-1, Embodiment-2, and/or above Embodiments, wherein the electromagnet's the plunger shaft 07 and/or 27 is a rod profile and likewise but not of hollow profile, and there no magnet detachable clamp device and lock bolt, and/or no central spline or shaft, to meet best performance of components and/or constraint of application requirements.

Embodiment-13: include Embodiment-1, Embodiment-2, and/or above Embodiments, wherein the electromagnet's the magnet on plunger shaft and/or transfer panel 06 and/or 24 of high flux density permanent magnet, each of different flux density, ring magnet, composite magnets and/or electromagnet, or not of high flux density magnet, to meet best performance of components and/or constraint of application requirements.

Embodiment-14: include Embodiment-1, Embodiment-2, and/or above Embodiments, wherein the electromagnets the magnet on plunger shaft and/or plunger material of ferromagnetic material and/or the components used of ferrous material, to meet best performance of components and/or constraint of application requirements.

Figure 12:
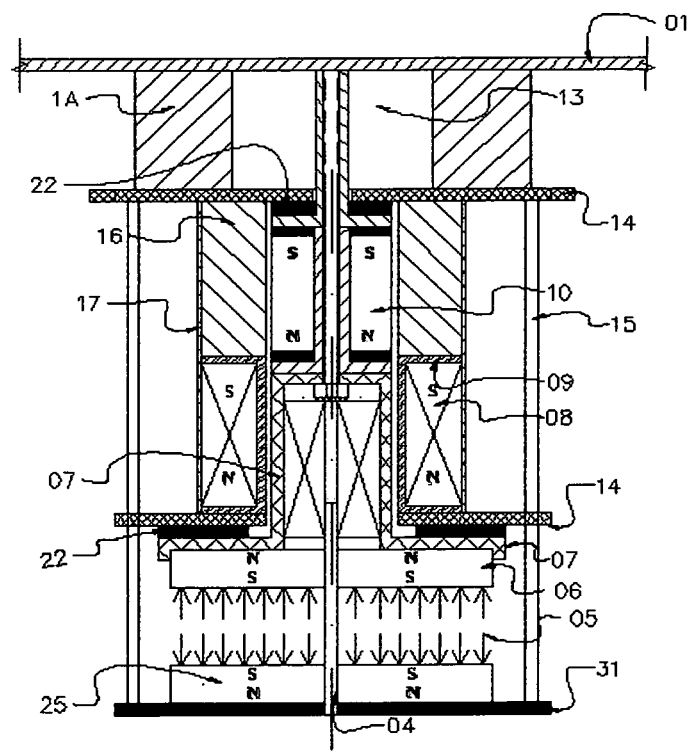
FIG. 12: Sectional view illustration only of a typical Levitation and Propulsion Unit-2 (LPU-2) under embodiment-15 which the assembly comprises of one electromagnet moving magnet linear actuator assembly complete with magnet 25 secured to casement panel 31 to create magnetic repulsive flux zone 05.

Embodiment-15: include Embodiment-1, Embodiment-2, and/or any of above Embodiments, wherein there only one electromagnet of coil 08 with magnet 25 secured to casement 31, to generate the impact resultant force or flux expansion motion via regulation and systematic control of current to coil 08—see FIG. 12.

Embodiment-16: include Embodiment-15, wherein casement 31 is adjustable and/or arranged with a motorized device/s to varies the distance between casement 31 and casement 14 to enable adjustment to the flux pressure within magnetic repulsive flux zone 05. This to enable adjustment of the potential energy or biased force via system control.

The invention claimed is:
1. An inertia thrust generating device comprising:
two electromagnet devices;
wherein each electromagnet device comprising:
a stator coil;
a plunger shaft; and
two magnets;
where each magnet is arranged with same polarity facing each other and secured at each end of the plunger shaft;
where the plunger shaft is arranged with one magnet at one end, near end or within the stator coil and the second magnet on the plunger shaft arranged at the other end or outside of the stator coil;

whereby the two electromagnet devices are arranged to create a compressed magnetic repulsive flux zone to makeup the inertia thrust generating device;

wherein each electromagnet device the stator coil is current controlled to exert a magnetic field driving force on the two magnets on the plunger shaft, to move plunger shaft;

where one magnet and the plunger shaft can move within the stator coil;

whereby the inertia thrust generating device is capable of creating a resultant thrust or motion as the result of the driven movement or non-driven movement of each plunger and the flux expansion of the compressed magnetic repulsive flux.

2. An inertia thrust generating device comprising of one electromagnet device in which comprising of one stator coil, a plunger shaft with two magnets are arranged with same polarity facing each other and secured at each end of the plunger shaft;

where the plunger shaft is arranged with one magnet at one end, near end or within the stator coil and the second magnet on the plunger shaft at the other end or outside of the stator coil;

wherein the inertia thrust generating device include one or more magnets attached to a mounting plate to create a compressed magnetic repulsive flux zone;

wherein the mounting plate is fixed or adjustable to vary the compression of magnetic repulsive flux zone;

wherein the stator coil is current controlled to exert a magnetic field driving force on the two magnets on the plunger shaft, to move the plunger shaft;

where one magnet and the plunger shaft can move within the stator coil;

whereby the inertia thrust generating device is capable of creating a resultant thrust or motion as the result of driven movement of the plunger shaft and the flux expansion of the compressed magnetic repulsive flux.

3. An inertia thrust generating device comprising of two electromagnet devices;

where one electromagnetic device comprising a stator coil, a plunger shaft with two magnets are arranged with same polarity facing each other and secured at ends of the plunger shaft;

where the plunger shaft is arranged with one magnet at one end, near end or within the stator coil and the second magnet on the plunger shaft at the other end or outside of the stator coil;

where at the second electromagnet device which comprising of same elements and similar arrangement as in first electromagnet device, in which further comprising of one or more magnets arranged between the stator coil and the magnet on the plunger shaft that is outside of the stator coil to create a compressed magnetic repulsive flux zone to makeup the second electromagnet device;

whereby the two electromagnet devices are arranged to create another compressed magnetic repulsive flux zone to makeup the inertia thrust generating device;

wherein each stator coil is current controlled to exert a magnetic field driving force on the two magnets on the plunger shaft, to move the plunger shaft;

where one magnet and the plunger shaft can move within the stator coil;

whereby the inertia thrust generating device is capable of creating a resultant thrust or motion as the result of driven movement or non-driven movement of each plunger shaft and the flux expansion of the compressed magnetic repulsive flux.

4. A-device as according to claim-1, claim-2 or claim-3, in which the plunger shaft at one or both electromagnet devices comprising more than two magnets.

5. A device as according to claim-1, claim-2 or claim-3, in which the plunger shaft at one or both electromagnet devices comprising one magnet.

6. A device as according to claim-1, claim-2 or claim-3, in which one or both electromagnet devices the plunger shaft and/or stator coil arranged with one or more magnet of high flux density permanent magnet, ring magnet, composite magnets and/or electromagnet.

7. A device as according to claim-1, claim-2 or claim-3, in which one or both electromagnet devices the plunger shaft of hollow or rod profile.

8. A device as according to claim-1, claim-2 or claim-3, further comprising of a short guiding shaft centrally arranged at the compressed magnetic repulsive flux zone.

* * * * *